Oct. 1, 1968  W. F. ERICKSON  3,403,757
BRAKE BAND AND METHOD OF MANUFACTURING THE SAME
Filed July 11, 1966
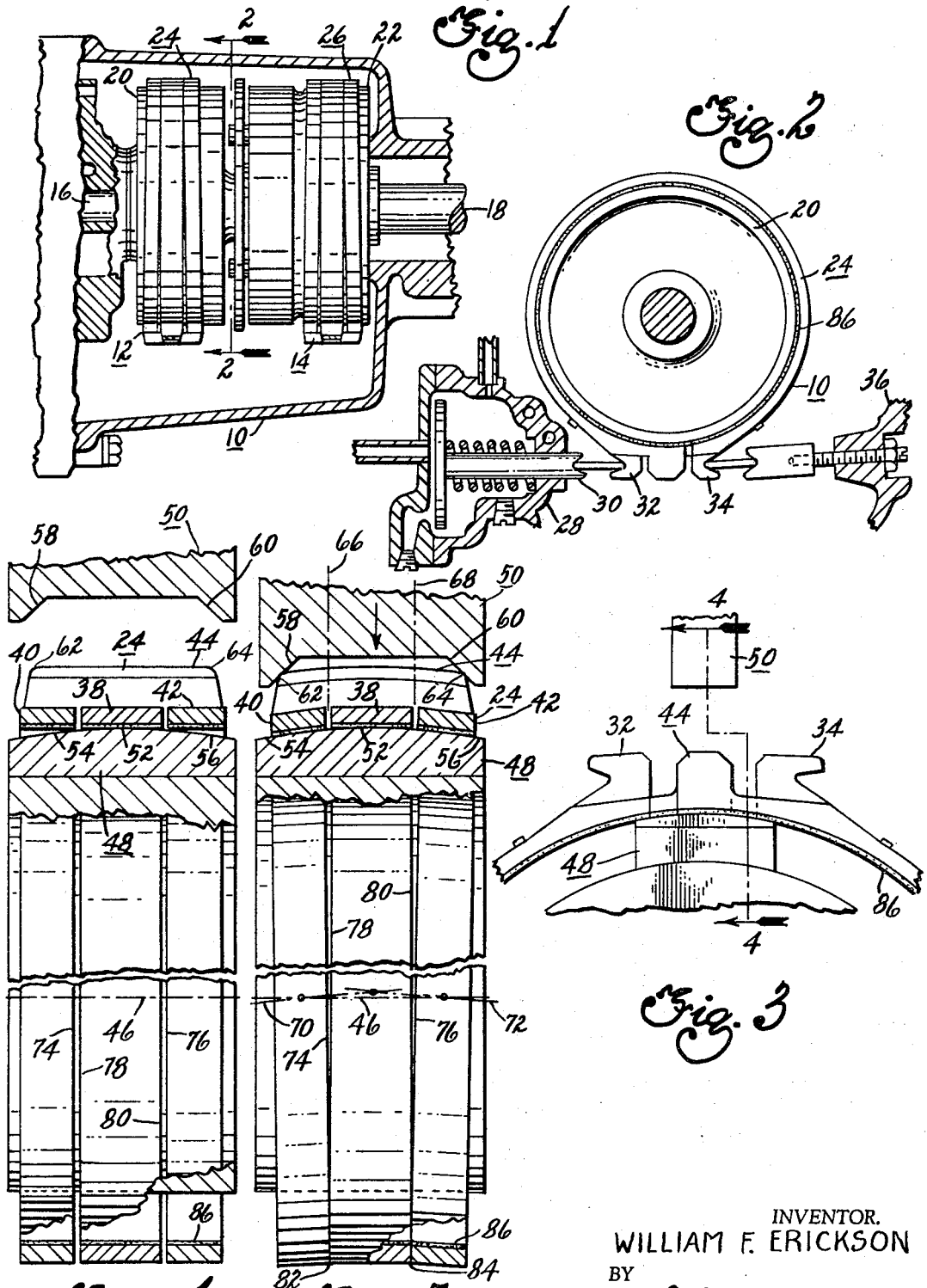
INVENTOR.
WILLIAM F. ERICKSON
BY
D.D. McGraw
ATTORNEY

United States Patent Office 3,403,757
Patented Oct. 1, 1968

3,403,757
BRAKE BAND AND METHOD OF MANUFACTURING THE SAME
William F. Erickson, Centerville, Ohio, assignor to General Motors Corporation, Detroit, Mich., a corporation of Delaware
Filed July 11, 1966, Ser. No. 564,324
6 Claims. (Cl. 188—77)

The invention relates to improvements over the brake band and method of manufacturing the brake band disclosed and claimed in United States Patents 2,867,898—Vosler et al., and 2,975,870—Vosler et al. The invention more particularly relates to improvements in a brake band to provide anti-rattle characteristics, and the method of manufacturing such a brake band. The invention is particularly adapted to multiple wrap brake bands of the type commonly used in controlling gear ratios and power transmission conditions in planetary gear type transmissions. Multiple wrap external brake bands have been utilized in conjunction with brake drums to establish various transmission operating conditions in automatic transmissions. In some installations when the temperature is sufficiently low brake band rattles have occurred when such brake bands were in the released position. For example, on cold starts when the temperature has been 40° F. or lower and when a typical transmission utilized in automotive vehicle production is in the "park" or "neutral" position, the forward clutch drum has been found to pick up cold lubricating oil and drag the oil between the face of the drum and the friction surface on the inner diameter of the brake band. Under these conditions the oil may be sufficiently thick to drag the band around toward the apply position, tending to wind up the band like a spring. When the resisting force exceeds the drag force exerted through the relatively thick oil, the band will snap back to its full released position. This may occur in a relatively rapid repeating apply and release sequence and cause an objectionable rattle. Such a rattle is eliminated when the brake band is applied by placing the transmission in one of the drive conditions wherein the brake band is required to hold its associated clutch drum against rotation.

It has been found that by changing the natural frequency of the band wraps or ribbons by forcing the outer ribbons against the inner ribbon of a three-wrap band, for example, the rattle will be substantially eliminated. The frictional rubbing of the edge surfaces of the wraps against each other will also introduce a damping action in such a band since adjacent bands are arranged to wrap more tightly about the drum by circumferential tightening in opposite directions. Thus a band tending to be wrapped toward the apply position by oil shear will be in engagement with one which has no tendency to wrap toward the apply position. The contact of adjacent ribbons or wraps need be provided only at points circumferentially spaced from the tie bar connecting the various wraps together, so that when the brake band is applied the band is sufficiently flexible to permit normal surface engagement of the band friction surface and the drum, thereby keeping the bands axially separated during the apply position with the center of each band in a plane normal to the axis of rotation of the drum being braked. When the brake band is released the wraps again assume their adjacent edge point contacting positions.

In the drawing:

FIGURE 1 is a cross sectional view of a part of a motor vehicle transmission illustrating the use of friction or brake bands of this invention.

FIGURE 2 is a cross sectional view taken in the direction of arrows 2—2 of FIGURE 1 and illustrating certain controls and adjustments for the brake band.

FIGURE 3 is a partial cross sectional view of a portion of one of the bands of FIGURE 1 and showing the band positioned in a fixture preparatory to completing the manufacture of the brake band.

FIGURE 4 is a partial section view of the band and fixture arrangement of FIGURE 3 in the direction of arrows 4—4 of that figure.

FIGURE 5 is a view similar to FIGURE 4 and showing the band in the fixture with the last manufacturing step having been completed.

The transmission 10 schematically illustrated in FIGURE 1 may be of the automatic type in which planetary gear assemblies 12 and 14 are provided to obtain different transmission operational conditions. The transmission has a driven shaft 16 and an output shaft 18 interconnected through the planetary gear assemblies 12 and 14. Each gear assembly includes drums 20, 22 and associated brake bands 24, 26. When a brake band is released the associated drum is permitted to rotate and when a brake band is applied the associated drum is prevented from rotation. Depending upon the particular transmission design, the drums may be connected to the various elements of the planetary gear assembly of which it forms a part. Thus by selectively engaging the brake bands various forward and reverse drives may be obtained. Since the particular transmission design forms no part of the invention other than the fact that the vehicle in which the transmission is installed may be started in a condition wherein the drum 20, for example, may be rotatable and brake band 24 may be in the released position, only a schematic representation of the transmission is shown in the drawing. As can be seen in FIGURE 2, the transmission 10 may include a suitable hydraulic servomotor 28 which upon receipt of fluid under pressure will move the plunger 30 against the connecting lug 32 forming a part of the brake band 24. Other connecting lugs 34 also forming a part of the brake band 24 are held stationary by an adjusting device 36 for regulating the clearance between the drum 20 and the brake band 24.

Since brake bands 24 and 26 may be of similar construction, only brake band 24 is described in detail. The brake band includes an inner wrap or ribbon 38 and outer wraps or ribbons 40 and 42 which when the band is installed extend circumferentially about the drum 20. One end of the inner ribbon 38 is fixedly connected to one side of a tie bar 44 and the other end is positioned adjacent the other side of the tie bar in spaced relation thereto and is provided with the connecting lugs 34. The outer ribbons 40 and 42 each have one end connected to the side of the tie bar 44 opposite the side to which the end of inner ribbon 38 is connected. Ribbons 40 and 42 extend circumferentially so that their other ends are adjacent but spaced from tie bar 44 and having connecting lugs 34 secured thereon. The ribbons are spaced apart in the area adjacent the tie bar as indicated in FIGURES 4 and 5. The brake band as shown in FIGURES 3 and 4 may be of the same type as that disclosed in the above noted Patent 2,975,870, and manufactured in accordance with the method invention disclosed and claimed in the above noted Patent 2,867,898 up to a point. At this point the spaces between the ribbons are such that the bands are parallel so that each band lies in a plane substantially perpendicular to the axis of rotation. Each band axis is coincident with the other band axis as is illustrated by axis line 46 in FIGURE 4. The band at this point may be referred to as a parallel ribbon multiple wrap band.

The parallel ribbon multiple wrap band is placed in a fixture schematically illustrated in FIGURES 3, 4 and 5. The fixture includes an anvil 48 and a force exerting press member 50. The anvil 48 is positioned radially inward of the band ribbons and has a center section 52 supporting the inner ribbon 38 radially inward of the tie bar 44. The portions 54 and 56 of the anvil 48 radially inward of ribbons 40 and 42 are preferably tapered in a radially decreasing taper away from the portion 52, as can best be seen in FIGURE 4. The press member 50 is schematically illustrated as having inwardly beveled edges 58 and 60 forming side walls of a depression and fitting over the tie bar 44 so that the beveled edges 58 and 60 engage the outer corners 62 and 64 of the tie bar. Thus movement of the press member 50 toward the anvil 48 exerts forces acting to deform the tie bar ends radially inwardly of the band until the ribbons 40 and 42 contact the anvil portions 54 and 56 as seen in FIGURE 5. This results in the tie bar being bent along crimp lines 66 and 68, which are generally in radial alignment with the spaces between the inner ribbon and the outer ribbons. This also tilts the axis 70 of ribbon 40 and the axis 72 of the ribbon 42 in opposite directions so that they are no longer aligned with the axis 46 of the center ribbon 38. This has the effect of moving the edge surfaces 74 and 76 of ribbons 40 and 42 toward the adjacent edge surfaces 78 and 80 of ribbon 38, with these adjacent edge surfaces being in contact with each other at points 82 and 84. It is preferred that the contact points 82 and 84 be circumferentially spaced from the tie bar substantially equidistant from the ends of the respective ribbons. In the usual brake band construction the contact points 82 and 84 are thus diametrically opposite the tie bar 44. Actual contact of the ribbons is necessary in order to change the natural frequency of the assembly and also to obtain the benefits of frictional damping afforded by adjacent ribbons. It has been found that good results are obtained when the ribbons are so positioned together that a separation force on the order of 1 lb. to 20 lbs. would be required.

The brake bands 24 may be constructed by providing a tie bar which is formed prior to attachment to the two separate ribbons so that the ribbons will assume the position shown in FIGURE 5 upon completion of the assembly. Also, instead of utilizing a press member having the tapered edges 58 and 60, separate force transmitting members may be utilized which transmit forces in a direction substantially perpendicular to the edges 58 and 60 as illustrated, thereby deforming the tie bar in the desired manner. The bands may also be made by hand to contact as above described. Other types of anvils may be utilized so long as they permit sufficient permanent deformation of the tie bar to provide the necessary ribbon frictional contact at points 82 and 84.

When brake bands embodying the invention are actuated, they are sufficiently flexible to permit substantially full engagement of the entire friction braking surface of the friction materials 86, formed on the inner annular surfaces of the ribbons, with the associated drum. Also, the bands are sufficiently spring-like in character so that upon release the ribbons return to the position shown in FIGURES 1 and 5. Thus when, for example, the transmission 10 is filled with oil such that drum 20 may rotate and pick up oil and tend to cause some of the ribbons to rattle as above described, the ribbons will be frictionally damped and the resonant frequencies will be such that the rattle is substantially eliminated.

What is claimed is:

1. A multiple wrap anti-rattle external brake band comprising a plurality of circumferentially extending brake ribbons having internal friction material thereon and a tie bar extending across and secured to said ribbons on the outer periphery thereof and holding the adjacent edge surfaces of said ribbons in spaced relation at said tie bar and in frictional anti-rattle contact at points circumferentially spaced from said tie bar when the band is in a released condition, said brake being sufficiently flexible to permit full surface contact of said internal friction material and a drum to be braked upon application of said band.

2. The brake band of claim 1, said ribbons each having one end fixed to said tie bar and the other end circumferentially movable relative to said tie bar to be applied and released, said ribbon adjacent edge surface frictional contact points being circumferentially substantially equidistant from said ribbon ends.

3. The brake band of claim 1, said frictional contact points being diametrically opposite said tie bar.

4. The brake band of claim 1, there being three of said ribbons with the two outer of said ribbons having axes intersecting each other and the axis of the center one of said ribbons with all of said axes lying in a common plane.

5. The brake band of claim 1, said ribbons including an inner longitudinally extending ribbon disposed between coextensively longitudinally extending outer ribbons, said inner ribbon having one end portion fixedly connected to said tie bar, said tie bar being fixedly connected to first end portions of said outer ribbons, said outer ribbons each having other end portions provided with connecting lugs circumferentially adjacent one side of said tie bar and said inner ribbon having a connecting lug on the other end portion thereof and circumferentially adjacent the other side of the tie bar, said ribbons being initially formed in spaced relation to each other to provide a smooth cylindrical surface on their radially inner peripheries, the ends of said tie bar connected to said outer ribbons being crimped radially inward in relation to the portion of said tie bar connected to said inner ribbon whereby the axes of said outer ribbons are positioned to intersect the axis of said inner ribbon and each other and the inner edges of said outer ribbons opposite said tie bar forcibly contacting the adjacent edges of said inner ribbon when said band is in the released position.

6. An external brake band comprising:
a plurality of circumferentially extending brake ribbons having internal friction material thereon;
a tie bar extending across and secured to one end of each of said ribbons and holding the adjacent edge surfaces of said ribbons in spaced relation at said tie bar ends;
each ribbon having a free end adjacent but circumferentially spaced from the tie bar;
said ribbons being so arranged that they extend from the tie bar ends to the free ends in alternatively opposite circumferential directions and are adapted to be applied to a device being braked by forces moving said free ends circumferentially toward said tie bar;
said tie bar also holding said ribbons in non-parallel, axially transverse, planes with said ribbon adjacent edge surfaces in frictional anti-rattle contact at points on said surfaces circumferentially spaced from said tie bar when the band is in a released condition;
each ribbon, which tends to be wrapped circumferentially toward the apply position by oil shear with the brake band in a released condition as the device to be braked rotates, being in frictional anti-rattle engagement with at least one other ribbon which has no concurrent tendency to be wrapped circumferentially toward the apply position.

References Cited

UNITED STATES PATENTS

| 2,637,415 | 5/1953 | Winther | 188—77 X |
| 2,975,870 | 3/1961 | Vosler et al. | 188—77 |

FOREIGN PATENTS 1,159,276  12/1963  Germany.

DUANE A. REGER, *Primary Examiner.*